United States Patent
Sun et al.

(10) Patent No.: US 9,325,454 B2
(45) Date of Patent: Apr. 26, 2016

(54) SYSTEM AND METHOD FOR HARQ ENTITY CONFIGURATION

(71) Applicant: FutureWei Technologies, Inc., Plano, TX (US)

(72) Inventors: Yishen Sun, Buffalo Grove, IL (US); Hao Bi, Lake Zurich, IL (US)

(73) Assignee: Futurewei Technologies, Inc., Plano, TX (US)

( * ) Notice: Subject to any disclaimer, the term of this patent is extended or adjusted under 35 U.S.C. 154(b) by 42 days.

(21) Appl. No.: 13/775,140

(22) Filed: Feb. 23, 2013

(65) Prior Publication Data

US 2013/0223344 A1     Aug. 29, 2013

Related U.S. Application Data

(60) Provisional application No. 61/603,055, filed on Feb. 24, 2012.

(51) Int. Cl.
*H04L 1/08* (2006.01)
*H04L 1/18* (2006.01)

(52) U.S. Cl.
CPC .............. *H04L 1/08* (2013.01); *H04L 1/1822* (2013.01); *H04L 1/1812* (2013.01); *H04L 1/1867* (2013.01)

(58) Field of Classification Search
USPC ........................................................ 370/328
See application file for complete search history.

(56) References Cited

U.S. PATENT DOCUMENTS

| | | | |
|---|---|---|---|
| 8,144,663 B2* | 3/2012 | Petrovic et al. | 370/331 |
| 8,644,268 B2* | 2/2014 | Zhang et al. | 370/336 |
| 8,649,363 B2* | 2/2014 | Wu | 370/343 |
| 8,689,073 B2* | 4/2014 | Cai et al. | 714/748 |
| 8,705,478 B2* | 4/2014 | Jung et al. | 370/329 |
| 8,767,655 B2* | 7/2014 | Aiba et al. | 370/329 |
| 8,817,673 B2* | 8/2014 | Li et al. | 370/278 |
| 2005/0094586 A1 | 5/2005 | Zhang et al. | |
| 2009/0300456 A1* | 12/2009 | Pelletier et al. | 714/749 |
| 2010/0232382 A1* | 9/2010 | Gauvreau et al. | 370/329 |
| 2010/0238880 A1* | 9/2010 | Wu | 370/329 |
| 2010/0281486 A1* | 11/2010 | Lu | H04W 72/1247 718/104 |
| 2011/0134774 A1* | 6/2011 | Pelletier et al. | 370/252 |

(Continued)

FOREIGN PATENT DOCUMENTS

CN     101867467 A     10/2010
CN     102025692 A      4/2011

(Continued)

OTHER PUBLICATIONS

3GPP TS 36.321, ver. 10.4.0 (Jan. 2012).*

(Continued)

*Primary Examiner* — Melvin Marcelo
*Assistant Examiner* — Peter Solinsky
(74) *Attorney, Agent, or Firm* — Slater Matsil, LLP

(57) ABSTRACT

A single hybrid automatic repeat request (HARQ) entity can be associated with multiple serving units to achieve lower complexity user-side signal processing during multi-point communication. Additionally, configuring a single HARQ entity to establish HARQ operations with multiple serving units may achieve lower latency communication when users are engaging in multi-point communications, such as coordinated multi-point transmission/reception (CoMP). HARQ entity associations and/or reconfigurations can be achieved through radio resource control (RRC) signaling.

32 Claims, 10 Drawing Sheets

(56) References Cited

U.S. PATENT DOCUMENTS

| | | | |
|---|---|---|---|
| 2011/0170499 A1* | 7/2011 | Nayeb Nazar et al. | 370/329 |
| 2011/0243039 A1* | 10/2011 | Papasakellariou et al. | 370/280 |
| 2011/0274063 A1* | 11/2011 | Li | 370/329 |
| 2011/0292894 A1 | 12/2011 | Wu | |
| 2012/0033587 A1* | 2/2012 | Papasakellariou et al. | 370/277 |
| 2012/0057560 A1* | 3/2012 | Park et al. | 370/329 |
| 2012/0113945 A1* | 5/2012 | Moon et al. | 370/329 |
| 2012/0294191 A1 | 11/2012 | Jung et al. | |
| 2012/0327875 A1* | 12/2012 | Han et al. | 370/329 |
| 2013/0070690 A1* | 3/2013 | Moon et al. | 370/329 |
| 2013/0182653 A1* | 7/2013 | Earnshaw et al. | 370/329 |
| 2013/0272221 A1* | 10/2013 | Hoehne et al. | 370/329 |
| 2014/0126512 A1* | 5/2014 | Kim et al. | 370/329 |
| 2014/0219185 A1* | 8/2014 | Etemad et al. | 370/329 |
| 2014/0241254 A1* | 8/2014 | Kaur et al. | 370/329 |
| 2015/0009930 A1* | 1/2015 | Rapaport et al. | 370/329 |

FOREIGN PATENT DOCUMENTS

| | | |
|---|---|---|
| WO | 2011084027 A2 | 7/2011 |
| WO | 2011123809 A1 | 10/2011 |

OTHER PUBLICATIONS

3GPP TS 25.331, ver. 10.4.0 (Jul. 2011).*

Extended European Search Report received in Application No. 13751322.2-1851 mailed Jun. 9, 2015, 12 pages.

Huawei, "HARQ Entity Operations for SCells," 3GPP TSG-RAN WG2 Meeting #71, R2-104861, Madrid, Spain, Aug. 23-27, 2010, 4 pages.

3GPP TR 36.819 v11.0.0, Technical Report, 3$^{rd}$ Generation Partnership Project; Technical Specification Group Radio Access Network; Coordinated Multi-Point Operation for LTE Physical Layer Aspects (Release 11), Sep. 2011, 68 pages.

3GPP TS 36.300 v11.0.0, Technical Specification, 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11), Dec. 2011, 194 pages.

3GPP TS 36.321 v10.4.0, Technical Specification, 3$^{rd}$ Generation Partnership Project; Technical Specification Group Radio Access Network; Evolved Universal Terrestrial Radio Access (E-UTRA); Medium Access Control (MAC) Protocol Specification, (Release 10), Dec. 2011, 54 pages.

3GPP TS 36.331 v10.4.0, Technical Specification, 3rd Generation Partnership Project; Technical Specification Group Radio Access Network; Evolved Universal Terrestrial Radio Access (E-UTRA); Radio Resource Control (RRC); Protocol Specification, (Release 10), Dec. 2011, 296 pages.

3GPP TS 36.331 v11.2.0, Technical Specification, 3rd Generation Partnership Project; Technical Specification Group Radio Access Network; Evolved Universal Terrestrial Radio Access (E-UTRA); Radio Resource Control (RRC); Protocol Specification, (Release 11), Dec. 2012, 340 pages.

3GPP, "3rd Generation Partnership Project; Technical Specification Group Radio Access Network; Evolved Universal Terrestrial Radio Access (E-UTRA); Radio Resource Control (RRC); Protocol Specification, (Release 8)," 3GPP TS 36.331 V8.0.0 Technical Specification, Dec. 2007, 56 pages.

International Search Report and Written Opinion received in International Application No. PCT/CN2013/071848 mailed Apr. 25, 2013, 11 pages.

NEC Group, "MAC Architecture for DC-HSDPA," 3GPP TSG-RAN WG1#53bis, R1-082366, Jun. 30-Jul. 4, 2008, Warsaw, Poland, 6 pages.

* cited by examiner

SYSTEM AND METHOD FOR HARQ ENTITY CONFIGURATION

This application claims the benefit of U.S. Provisional Application No. 61/603,055 filed on Feb. 24, 2012, and entitled "System and Method for HARQ Entity Configuration," which is incorporated herein by reference as if reproduced in its entirety.

TECHNICAL FIELD

This disclosure relates to wireless communications, and, in particular embodiments, to systems and methods for hybrid automatic repeat request (HARQ) entity configuration.

BACKGROUND

Modern wireless networks often implement hybrid automatic repeat request (HARQ) operations to provide error control and data recovery. For instance, receivers may communicate acknowledgements (ACKs) or negative-acknowledgements (NACKs) to indicate whether or not a previous transmission was successfully decoded. When previous transmissions are not successfully decoded, transmitter may (re)communicate the original transmission or forward error correction (FEC) bits related thereto via HARQ operation so that receivers may obtain data communicated in the earlier transmission.

SUMMARY

Technical advantages are generally achieved by embodiments of this disclosure, which describe a system and method for HARQ entity configuration.

In accordance with an embodiment, a method for HARQ entity association is provided. In this example, the method includes associating a single hybrid automatic repeat request (HARQ) entity with multiple serving units serving a user equipment (UE). An apparatus for performing this method is also provided.

In accordance with another embodiment, a method for HARQ entity reconfiguration is provided. In this example, the method includes reconfiguring an existing HARQ entity in a user equipment (UE). The existing HARQ entity is associated with one or more existing serving units prior to being reconfigured. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
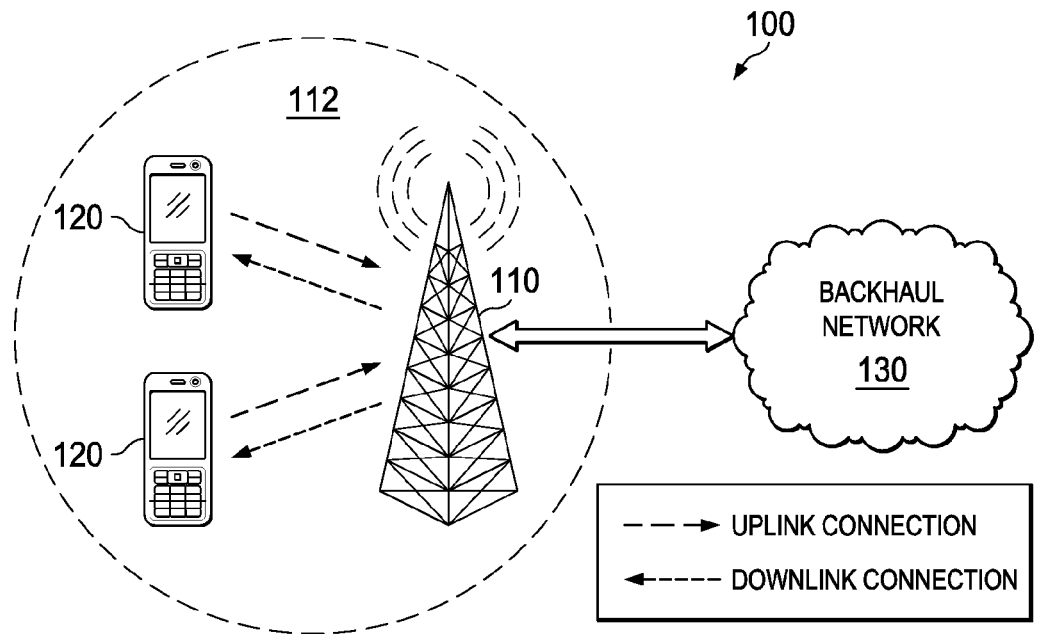
FIG. 1 illustrates a diagram of a network for communicating data.

The making and using of the embodiments of this disclosure are discussed in detail below. It should be appreciated, however, that aspects of this disclosure may be embodied in a wide variety of specific contexts. The specific embodiments discussed are merely illustrative of specific ways to make and use the invention, and do not limit the scope of the invention.

Generally speaking, HARQ operations are performed by HARQ entities, which may typically reside in the medium access control (MAC) layer (or some other layer) of the transmitter and/or receiver. When communicating with multiple cells, a separate HARQ entity may be established in the MAC layer (or some other layer) of the UE for each serving cell communicating with the UE. For instance, if a UE is communicating with two serving cells, then two different HARQ entities are established in the MAC layer of the UE. While establishing a separate HARQ entity for each serving cell may allow data to be more easily processed in accordance with attributes of the source/destination, the inclusion of additional HARQ entities may increase UE processing complexity and/or introduce latency when a data stream is being communicated by multiple points. More specifically, the additional processing and/or latency may arise from the need to evaluate data communicated by different HARQ entities. For instance, HARQ entities receiving a joint transmission from multiple serving cells may need to combine and/or collectively evaluate their received data in order to determine whether the transmission was successfully received. As such, a mechanism for reducing the number of HARQ entities established in the UE during multiple point communications is desired.

Disclosed herein are techniques for configuring a single HARQ entity to associate HARQ operations with multiple serving units, which may allow for less complex user-side processing as well as lower latencies for communicating data. In this disclosure, the term serving unit may refer to serving cells, transmit points, reception points, carriers, ports, or resources (e.g., resources represented by different reference signals, e.g., channel-state information—reference signals (CSI-RSs), cell-specific reference signals (CRSs) or otherwise). While many aspects of this disclosure are discussed in the context of serving cells, such aspects are equally applicable to the broader classification of serving units. Hence, the terms serving units and serving cells are used interchangeably throughout the detailed description, unless otherwise specified. In some embodiments, configuring a single HARQ entity to establish HARQ operations with multiple serving cells may enable lower complexity signal processing for UEs engaging in multi-cell communications (e.g., coordinated multi-point transmission/reception (CoMP), etc.). In one example, a single HARQ entity performs HARQ operations with each of a plurality of serving units communicating with the UE. In another example, a single HARQ entity performs HARQ operations with a subset of the serving cells communicating with the UE. Also provided herein are radio resource control (RRC) signaling techniques for communicating HARQ entity configuration instructions from a controller to the UE.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc. As discussed herein, the term controller may refer to network-side communications equipment, including access points, base stations, centralized controllers, and other equipment controlled by a network operator.

In some networking environments, multiple serving units may be used to communicate with a single user. For instance, multiple serving cells may collaborate with one another to communicate with a single user using CoMP or carrier aggregation (CA) communication techniques. In the downlink direction, multiple serving cells may collaborate to transmit data to a single user equipment (UE) in accordance with a downlink CoMP communication technique, such as a join transmission (JT) technique or a dynamic point selection (DPS) communication techniques. In then uplink direction, multiple serving cells may collaborate to receive a data transmission from a single UE in accordance with joint reception (JR) techniques. CoMP communication techniques may also include coordinated scheduling/beamforming (CS/CB) in which scheduling decisions are coordinated amongst a plurality of serving cells.

Figure 2:
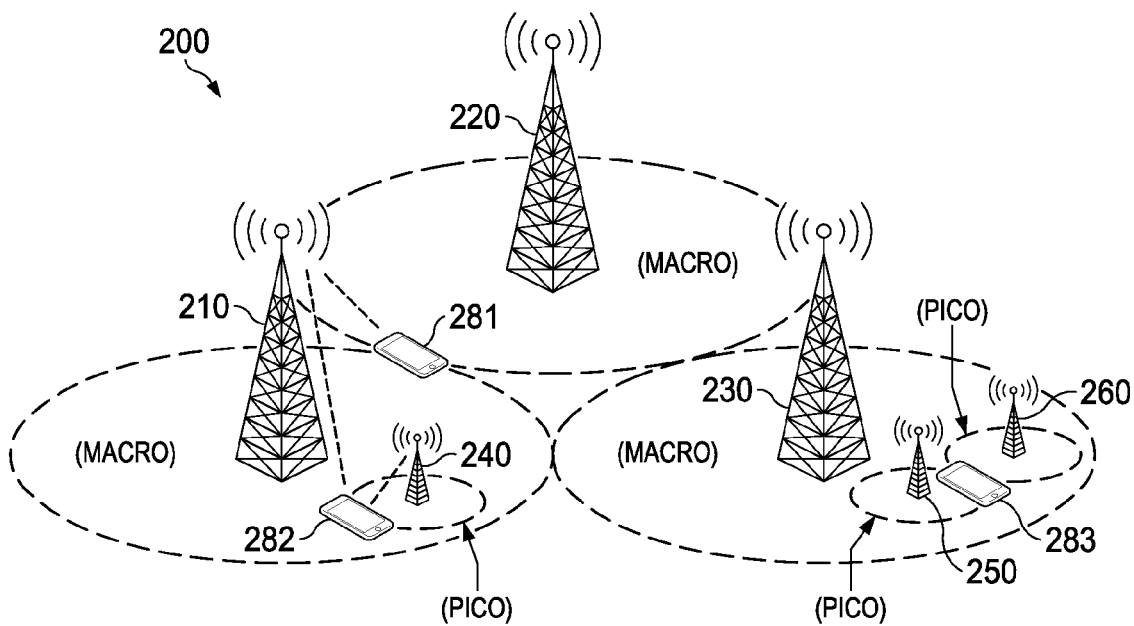
FIG. 2 illustrates a diagram of a network for communicating data in accordance with a multipoint communication technique.

FIG. 2 illustrates a network 200 for communicating data in accordance with a CoMP or carrier aggregation (CA) communication technique. The network 200 includes a plurality of macro-base stations 210-230 providing wireless access in macro-cells, as well as a plurality of pico base stations 240-260 providing wireless access in pico-cells. Multiple macro base stations can coordinate with one another to achieve CoMP communication with a user, as evidenced by the macro base stations 210, 220 communicating with the UE 281. Additionally, macro base stations can coordinate with pico base stations to achieve CoMP communication with a user, as evidenced by the pico/macro base stations 210, 240 communicating with the UE 282. Further, two or more pico base stations can coordinate with one another to achieve CoMP communication with a user, as evidenced by the pico base stations 250, 260 communicating with the UE 283.

Figure 3:
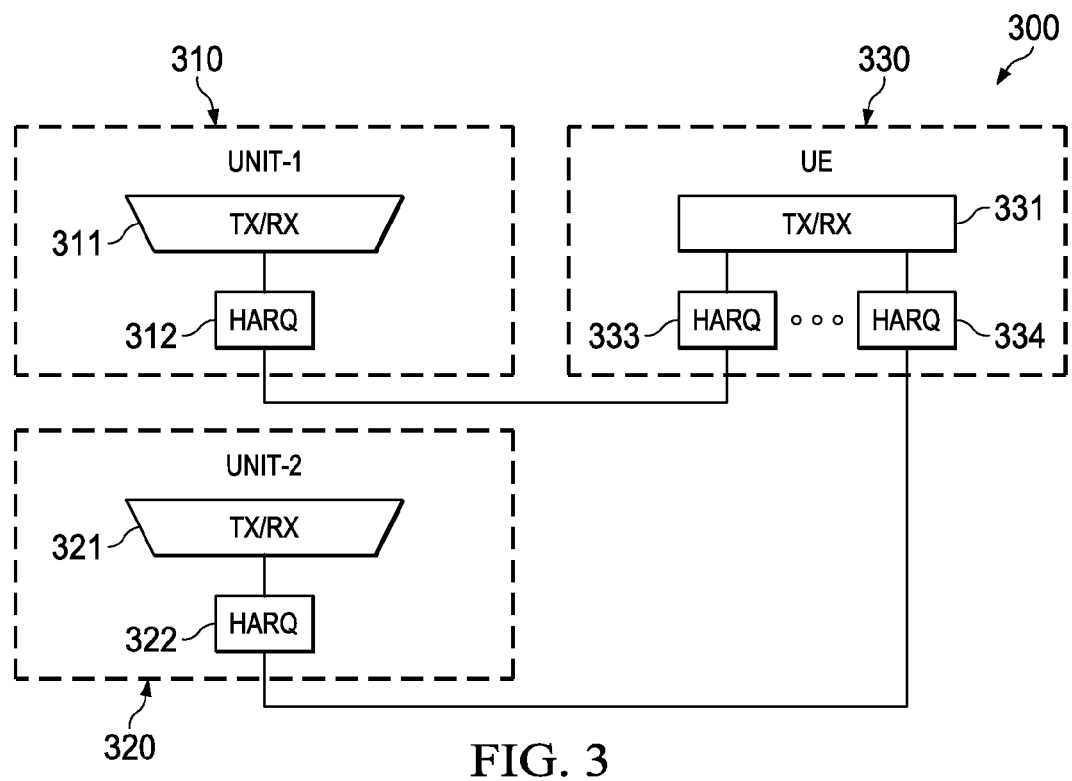
FIG. 3 illustrates a diagram of a conventional architecture for communicating data in accordance with a carrier aggregation communication technique.

Conventionally, UEs engaging in multi-cell communication will establish a separate HARQ entity for each serving cell. FIG. 3 illustrates a conventional architecture 300 for communicating data in accordance with a carrier aggregation (CA) communication technique. As shown, the architecture 300 includes a first serving cell 310, a second serving cell 320, and a UE 330. The first serving cell 310 includes a transceiver module 311 and a HARQ entity 312. Similarly, the second serving cell 320 includes a transceiver module 321 and a HARQ entity 322. The UE 330 includes a transceiver module 331, a first HARQ entity 333, and a second HARQ entity 334. Notably, in the conventional network 300, the UE 330 includes the first HARQ entity 333 for the first serving cell 310, and the second HARQ entity 334 for the second serving cell 320.

Figure 4:
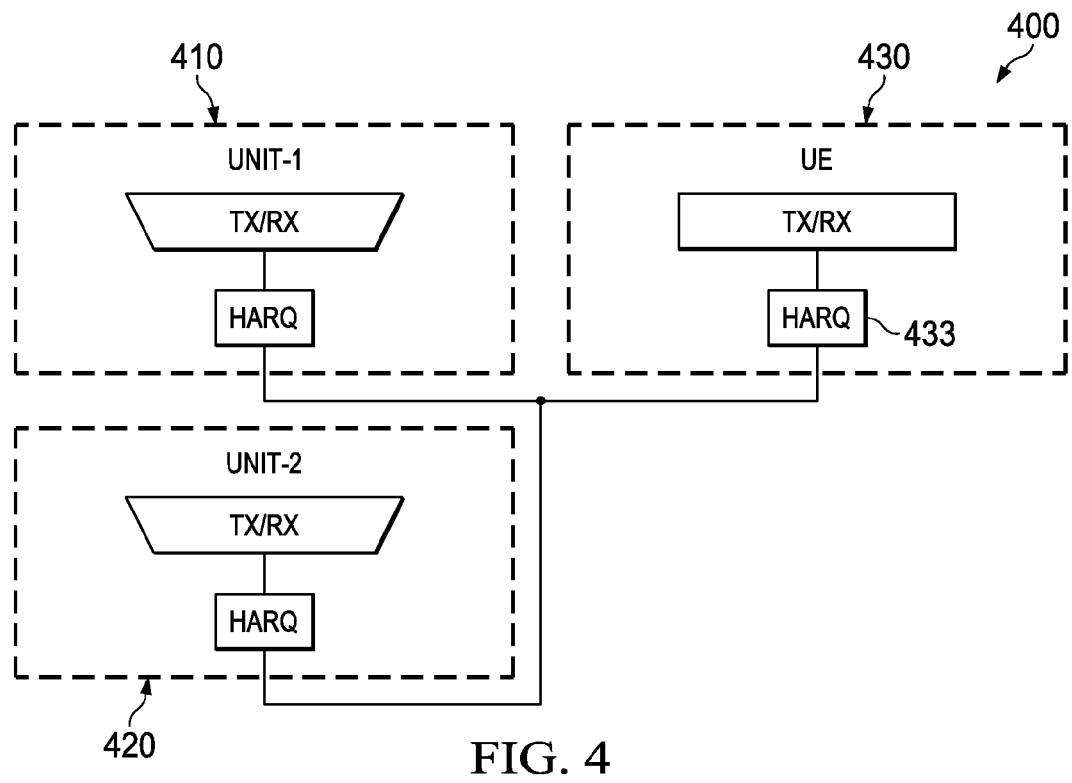
FIG. 4 illustrates a diagram of an embodiment architecture for communicating data in accordance with a multiple points communication technique.

The number of HARQ entities in a given UE can be decreased by configuring a single HARQ entity for multiple serving cells. In some embodiments, a single HARQ entity may engage in HARQ operations with all serving cells communicating with a UE. FIG. 4 illustrates an embodiment architecture 400 in which serving units 410, 420, are communicating with a UE 430 in accordance with a multi-point communication scheme. Notably, the UE 430 includes a single HARQ entity 433 for both of the serving units 410-420. The serving units 410, 420 may correspond to different cells, different communication points, and/or different carriers, and may include macro base stations, pico base stations, or a mixture thereof.

Figure 5:
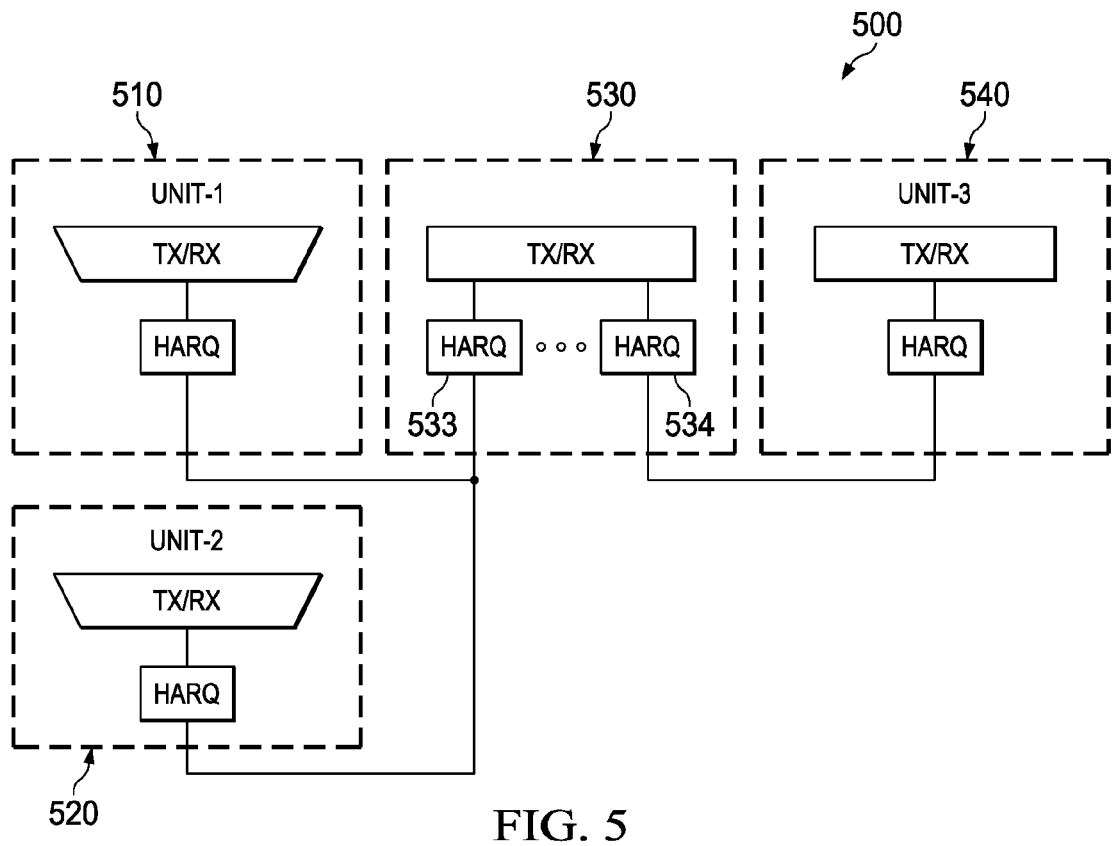
FIG. 5 illustrates a diagram of another embodiment architecture for communicating data in accordance with a multiple points communication technique.

In other embodiments, a single HARQ entity may engage in HARQ operations with a subset of serving cells communicating with a UE. FIG. 5 illustrates an embodiment network 500 for communicating data in accordance with a multi-point communication scheme. As shown, the serving units 510, 520, 540 may be cooperating to communicate with the UE 530 in accordance with a CoMP or CA scheme. Notably, the UE 530 includes a first HARQ entity 533 for a subset of serving units 510-520, and a second HARQ entity 544 for a serving unit 540. The serving units 510, 520, 540 may correspond to different cells, different communication points, and/or different carriers, and may include macro base stations, pico base stations, or a mixture thereof.

In some embodiments, RRC messages may be used to associate HARQ operations of multiple serving units with HARQ entities, such as to establish new HARQ entities, as well as to reconfigure/remove existing HARQ entities. In some embodiments, the RRC messages may include explicit instructions for configuring/reconfiguring HARQ entities. For instance, an RRC message may explicitly identify a HARQ entity and/or serving units by a reference identifier. In other embodiments, RRC messages may include implicit instructions for configuring/reconfiguring HARQ entities. For instance, an RRC message may implicitly identify a HARQ entity by a property or characteristic of the HARQ entity. Moreover, the RRC message may implicitly identify one or more serving units by listing a property or characteristic of the serving unit. For instance, the RRC message may list a carrier frequency, spatial position, or some other property corresponding to one or more serving cells that are associated with a single HARQ entity.

Figure 6:
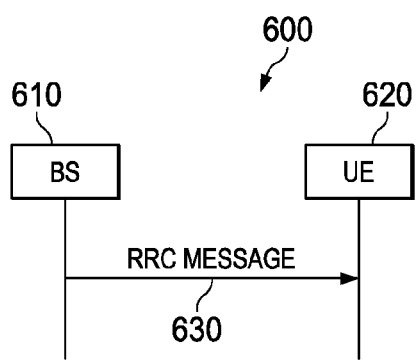
FIG. 6 illustrates a diagram of an embodiment communications sequence for configuring a HARQ entity in a UE.

FIG. 6 illustrates an embodiment communications sequence 600 in which a controller 610 communicates an RRC message 630 to a UE 620. The RRC message may indicate the addition or removal of a serving cell. The RRC message 630 may also include a HARQ entity configuration field. When the RRC message 630 indicates the addition of a new serving cell, the HARQ entity configuration field may indicate that a new HARQ entity is to be established for serving the new serving cell, or that an existing HARQ entity should be reconfigured to serve the new serving cell. When the RRC message 630 indicates the removal of an existing serving cell, the HARQ entity configuration field may indicate whether the HARQ entity previously associated with the removed serving cell should be removed or reconfigured.

Figure 7:
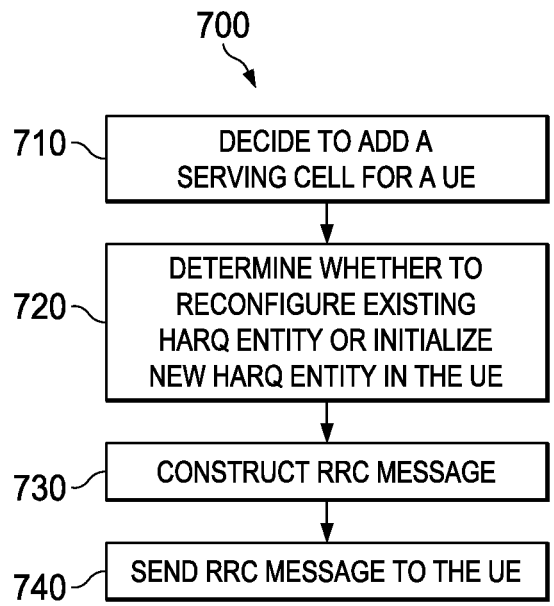
FIG. 7 illustrates a flowchart of an embodiment method for adding a serving cell to a UE.

FIG. 7 illustrates a method 700 for adding a serving cell to a UE, as might be performed by a controller. The method 700 begins at step 710, where the controller decides to add a serving cell for the UE. Next, the method 700 proceeds to step 720, where the controller determines whether to reconfigure an existing HARQ entity in the UE to serve the new serving cell or, alternatively, to initialize a new HARQ entity in the UE to serve the new serving cell. Thereafter, the method 700 proceeds to step 730, where the controller constructs the RRC message to indicate the initialization of a new HARQ entity or the reconfiguration of an existing HARQ entity, per the determination made in step 720. In some embodiments, the controller may indicate in the RRC message the addition of multiple serving cells and/or the initialization/reconfiguration of multiple serving cells, and the association between HARQ entities and the multiple serving cells to be added/initialized/reconfigured. Finally, the method 700 proceeds to step 740, where the controller sends the RRC message to the UE.

Figure 8:
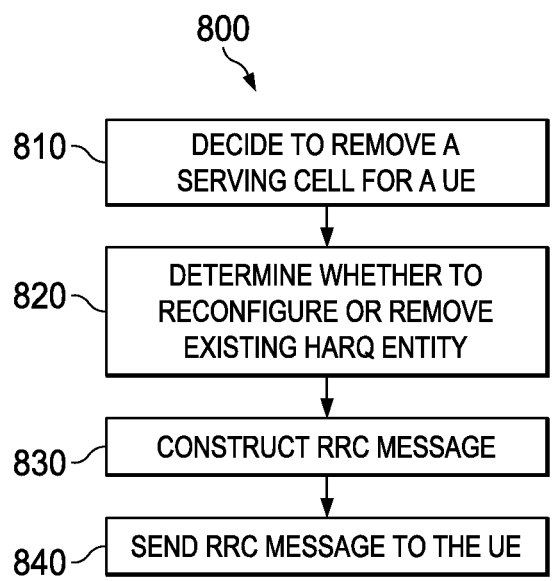
FIG. 8 illustrates a flowchart of an embodiment method for removing a serving cell from a UE.

FIG. 8 illustrates a method 800 for removing a serving cell from a UE, as might be performed by a controller. The method 800 begins at step 810, where the controller decides to remove a serving cell from the UE. Next, the method 800 proceeds to step 820, where the controller determines whether to reconfigure or remove the existing HARQ entity from the UE. Thereafter, the method 800 proceeds to step 830, where the controller configures the RRC message to indicate removing/reconfiguring the existing HARQ entity, per the determination made in step 820. In some embodiments, the controller may construct the RRC message to indicate the removal/reconfiguration of multiple serving cells, and the association between HARQ entities and the multiple serving cells to be removed/reconfigured. Finally, the method 800 proceeds to step 840, where the controller sends the RRC message to the UE.

Figure 9:
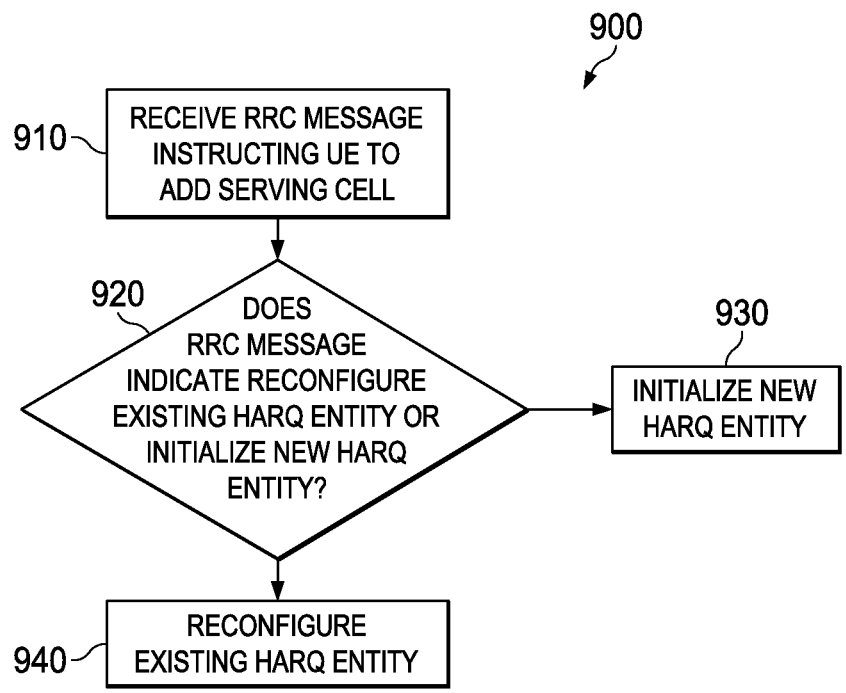
FIG. 9 illustrates a flowchart of an embodiment method for adding a serving cell pursuant to an instruction from a controller.

FIG. 9 illustrates a method 900 for adding a serving cell pursuant to an instruction from a controller, as might be performed by a UE. The method 900 begins at step 910, where the UE receives an RRC message from a controller indicating that a serving cell is to be added. In some embodiments, the RRC message may indicate the addition of multiple new serving cells, and the association between HARQ entities and the multiple serving cells to be added. Next, the method 900 proceeds to step 920, where the UE determines whether the RRC message indicates reconfiguring an existing HARQ entity or initializing a new HARQ entity for the new serving cell. If the RRC message indicates initializing a new HARQ entity, then the method 900 proceeds to step 930, where the UE initializes a new HARQ entity and associates the new serving cell with the new HARQ entity. Otherwise, if the RRC message indicates reconfiguring an existing HARQ entity, then the method 900 proceeds to step 940, where the UE reconfigures an existing HARQ entity and associates the new serving cell with the existing HARQ entity.

Figure 10:
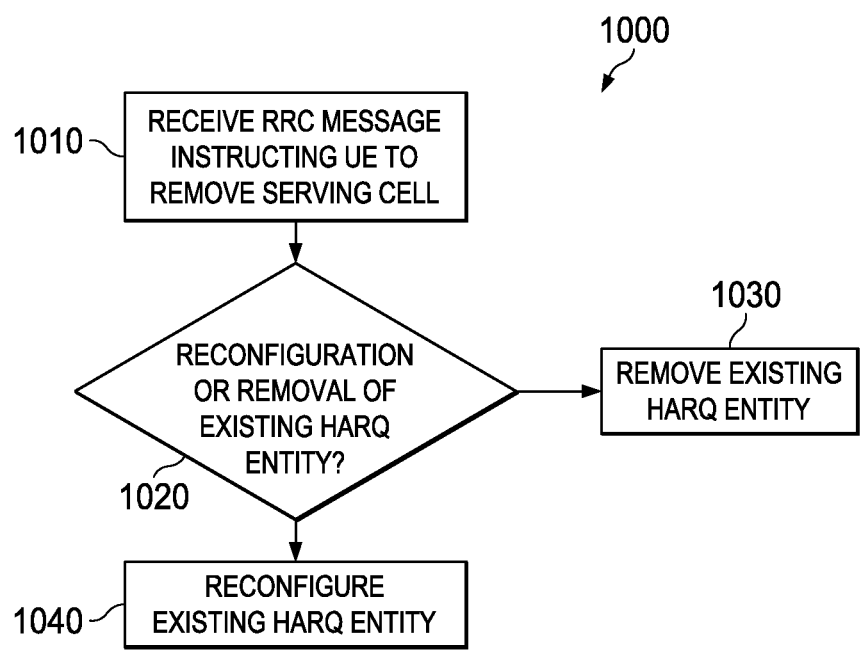
FIG. 10 illustrates a flowchart of an embodiment method for removing a serving cell pursuant to an instruction from a controller.

FIG. 10 illustrates a method 1000 for removing a serving cell pursuant to an instruction from a controller, as might be performed by a UE. The method 1000 begins at step 1010, where the UE receives an RRC message from a controller indicating that a serving cell is being removed. In some embodiments, the RRC message may indicate the removal of multiple serving cells, and the association between HARQ entities and the multiple serving cells to be removed. Next, the method 1000 proceeds to step 1020, where the UE determines whether the existing HARQ entity that is associated with the removed serving cell needs to be reconfigured or removed. In one embodiment, the determination may be made based on an explicit instruction included in the RRC message. Alternatively, the determination may be based on an implicit instruction. For instance, the UE may decide to remove a HARQ entity upon determining that there are no remaining serving cells associated with the existing HARQ entity after removing the serving cell indicated in the RRC message. If the RRC message indicates removing the existing HARQ entity or there is no other serving cells associated with the existing HARQ entity, then the method 1000 proceeds to step 1030, where the UE removes the existing HARQ entity. Otherwise, if the RRC message indicates reconfiguring the existing HARQ entity or there is at least one other serving cell associated with the existing HARQ entity, then the method 1000 proceeds to step 1040, where the UE reconfigures the existing HARQ entity.

Coordinated multi-point (CoMP) transmission/reception is considered for LTE-Advanced as a tool to improve the coverage of high data rates, the cell-edge throughput and/or to increase system throughput in both high load and low load scenarios.

Downlink (DL) coordinated multi-point transmission implies dynamic coordination among multiple geographically separated transmission points. Each DL CoMP scheme may be categorized into one of the following categories:

(i) Joint Processing (JP): Data for a user equipment (UE) is available at more than one point in the CoMP cooperating set for a time-frequency resource. JP may be further categorized into Joint Transmission (JT) and Dynamic Point Selection (DPS)/muting. (ii) Coordinated Scheduling/Beamforming (CS/CB): Data for an UE is only available at and transmitted from one point in the CoMP cooperating set (DL data transmission is done from that point) for a time-frequency resource, but user scheduling/beamforming decisions are made with coordination among points corresponding to the CoMP cooperating set. The transmitting points are chosen semi-statically. (iii) Hybrid category of JP and CS/CB.

Uplink (UL) coordinated multi-point reception implies coordination among multiple, geographically separated points. Each UL CoMP scheme may be categorized into one of the following categories: (i) Joint Reception (JR): physical uplink shared channel (PUSCH) transmitted by the UE is received jointly at multiple points (part of or entire CoMP cooperating set) at a time, e.g., to improve the received signal quality. (ii) Coordinated Scheduling and Beamforming (CS/CB): User scheduling and precoding selection decisions are made with coordination among points corresponding to the CoMP cooperating set. Data is intended for one point only.

The LTE Layer 2 is split into the following sublayers: Medium Access Control (MAC), Radio Link Control (RLC) and Packet Data Convergence Protocol (PDCP). The main services and functions of the MAC sublayer include but are not limited to: multiplexing/demultiplexing of MAC service data units (SDUs) belonging to one or different logical channels into/from transport blocks (TB) delivered to/from the physical layer on transport channels; error correction through HARQ; priority handling between logical channels of one UE; and priority handling between UEs by means of dynamic scheduling.

An embodiment provides hybrid automatic repeat request (HARQ) entity configuration for a medium access control (MAC) entity in a multi-point communication system, for example, the one supporting coordinated multi-point (CoMP) operation. The embodiment provides simplified and flexible HARQ process handling, for example, for CoMP operation. Embodiments may be applied to cellular network systems and equipment, such as Long Term Evolution (LTE) UEs and eNobeBs (eNBs).

Figure 11:
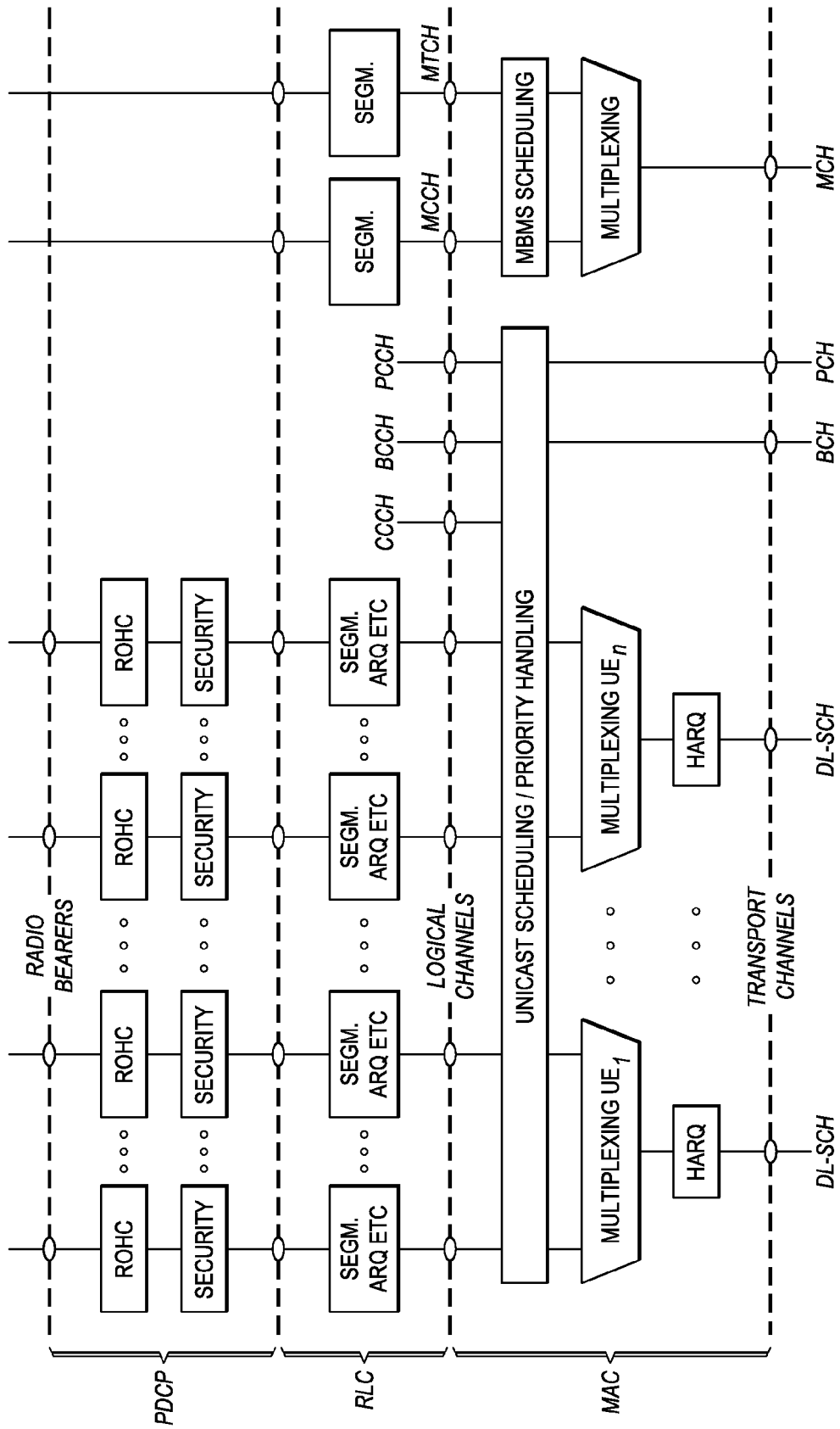
FIG. 11 illustrates a diagram of a Layer 2 structure for downlink communication.
Figure 12:
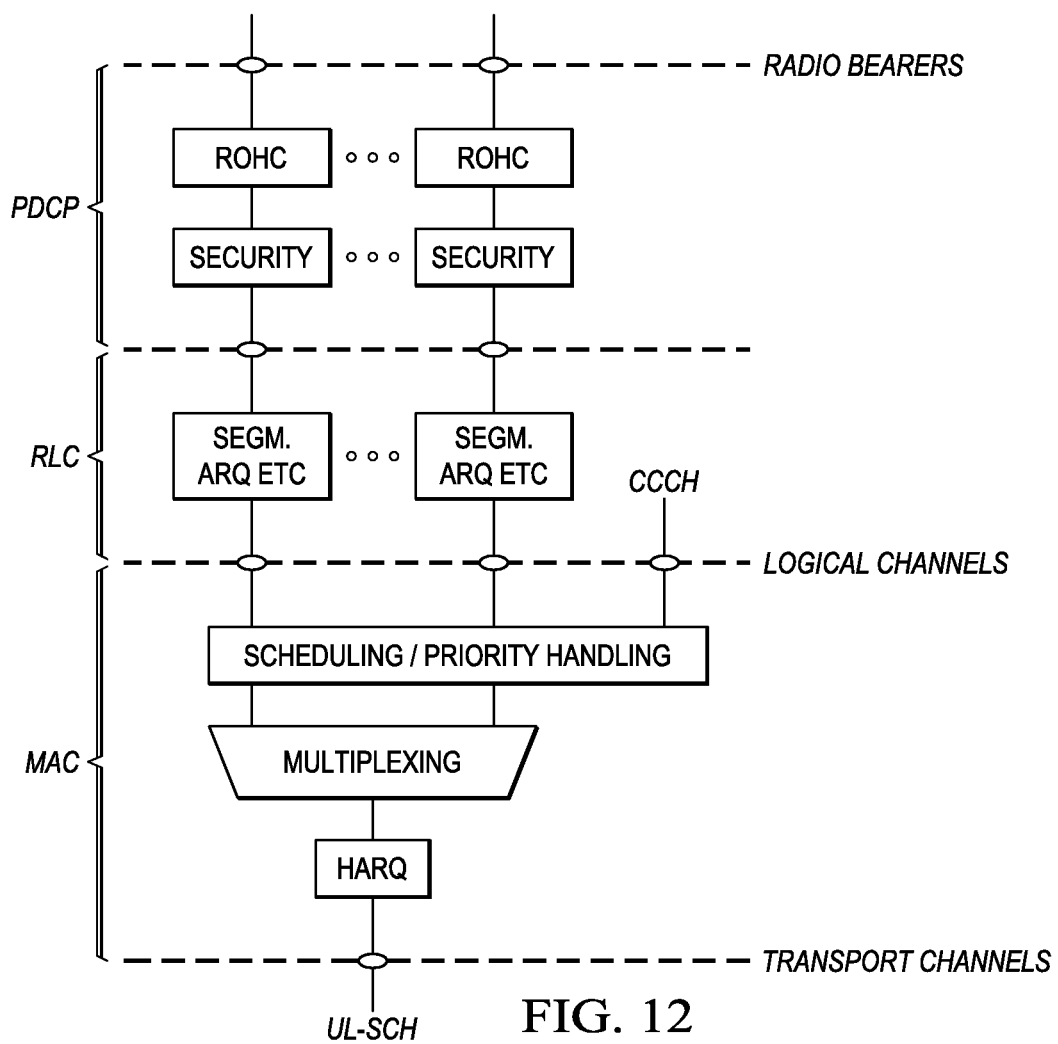
FIG. 12 illustrates a diagram of a Layer 2 structure for uplink communication.
Figure 13:
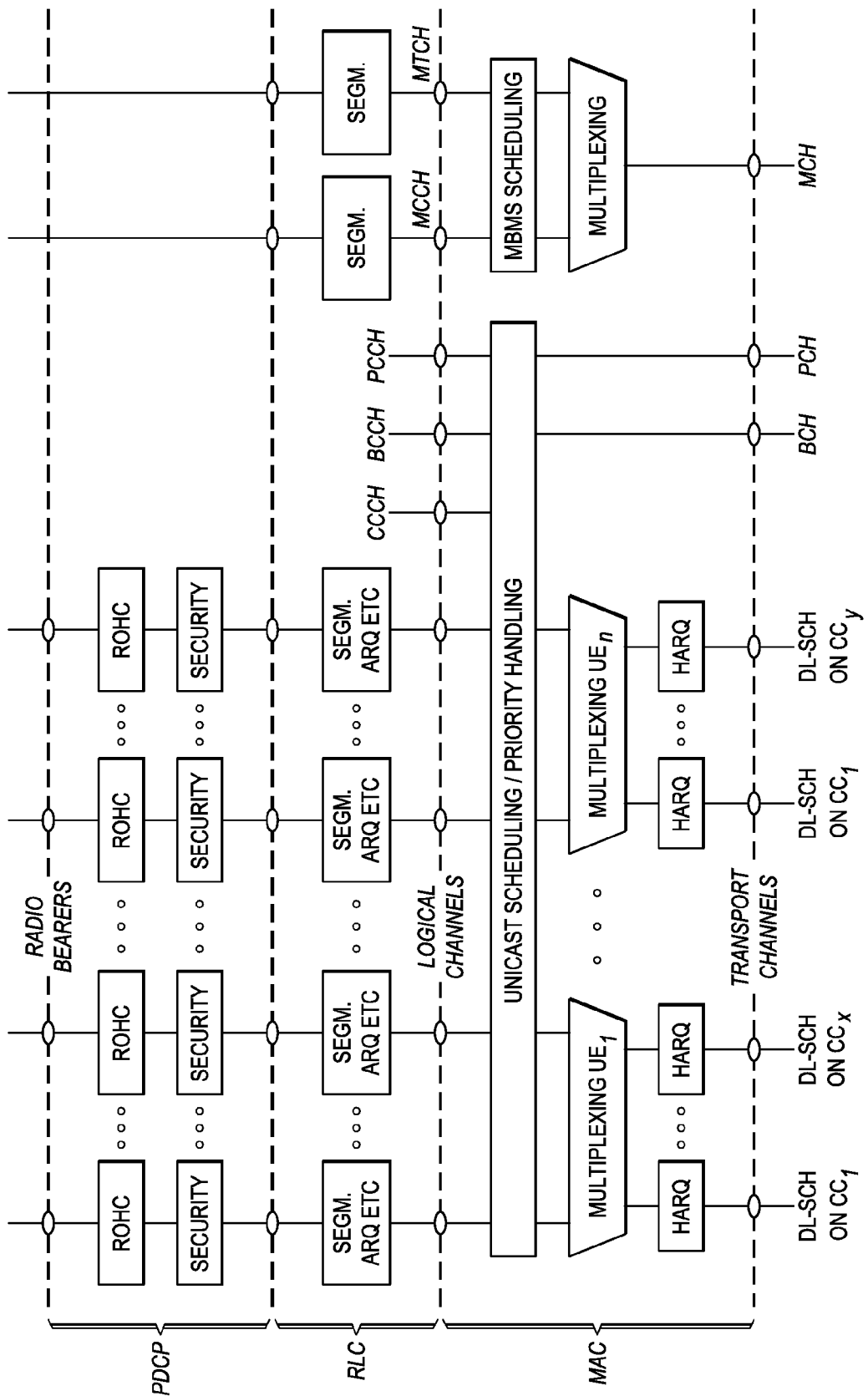
FIG. 13 illustrates a diagram of another Layer 2 structure for downlink communication.
Figure 14:
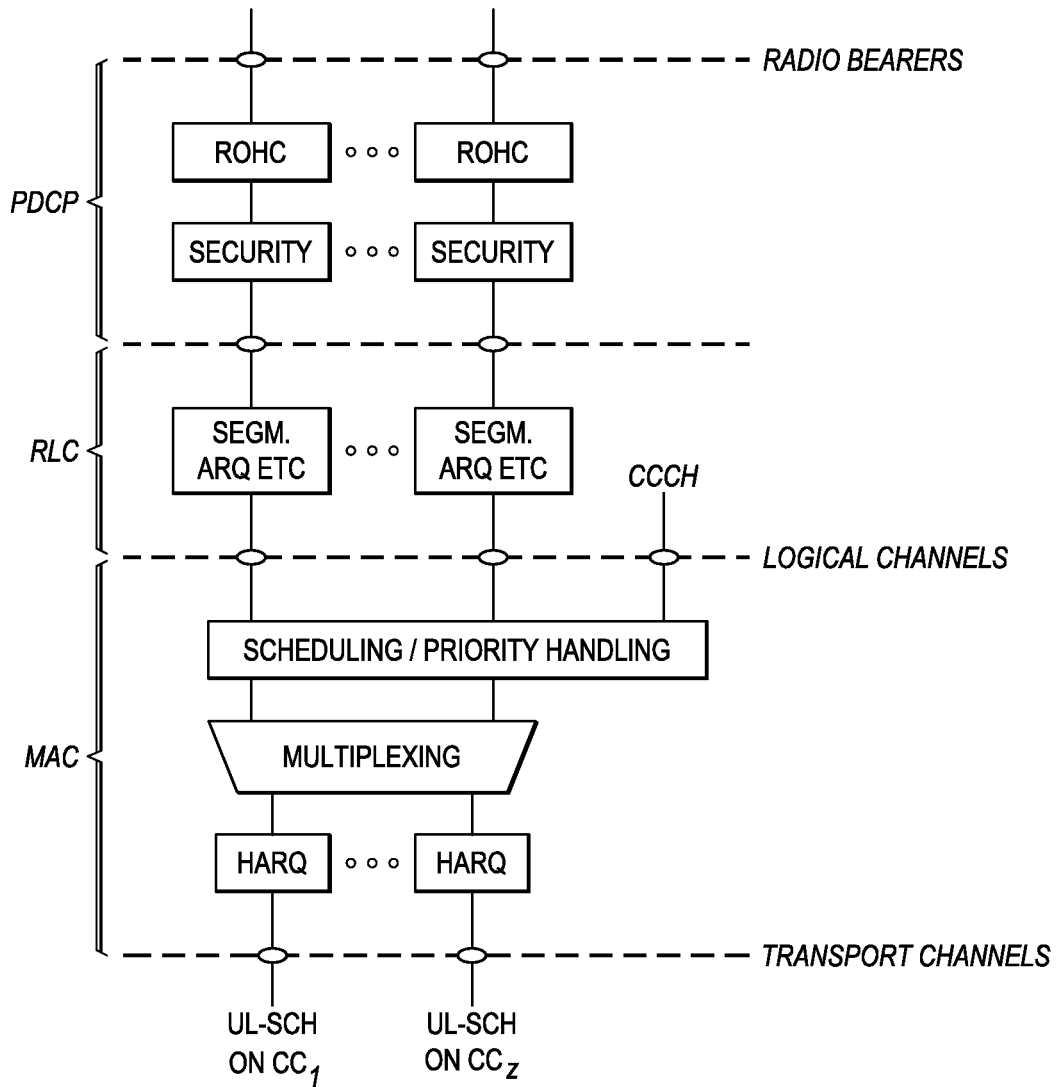
FIG. 14 illustrates a diagram of another Layer 2 structure for uplink communication.

LTE Layer 2 is split into the following sublayers: Medium Access Control (MAC), Radio Link Control (RLC) and Packet Data Convergence Protocol (PDCP). FIG. 11 illustrates a Layer 2 structure for DL without carrier aggregation (CA), and FIG. 12 illustrates a Layer 2 structure for UL without CA. More specifically, FIGS. 11-12 depict the Packet Data Convergence Protocol (PDCP), Radio link control (RLC), MAC architecture for downlink and uplink when CA is not configured, and there is only one MAC entity for all UEs at the enhanced node B (eNB) in the downlink and one MAC entity for the UE at the UE in the uplink. A UE exchanges data with only one serving cell in both uplink and downlink at any time. Consequently, there is only one HARQ entity per UE within the MAC entity when CA is not configured, and the HARQ entity is associated with the only serving cell. FIG. 13 illustrates a Layer 2 structure for DL with CA configured, and FIG. 14 illustrates a Layer 2 structure for UL with CA configured. More specifically, FIGS. 13-14 depict the PDCP, RLC, MAC architecture for downlink and uplink when CA is configured. There is still only one MAC entity for all UEs and all carriers at the eNB in the downlink and one MAC entity for the UE and all carriers at the UE in the uplink. A difference between FIGS. 13-14 and FIGS. 11-12 is that there is one independent hybrid-ARQ entity per serving cell per UE within the MAC entity. This is because a UE may exchange data with multiple serving cells in both the uplink and downlink simultaneously when CA is configured. Consequently, there may be multiple HARQ entities per UE within the MAC entity, and each HARQ entity is associated with one serving cell only.

A commonality between each of FIGS. 11-14 is that there is one independent HARQ entity per serving cell per UE within the MAC entity. If a UE exchanges data with only one serving cell, there is one HARQ entity per UE within the MAC entity (at the eNB or at the UE), which is the case of FIGS. 11-12. If a UE exchanges data with multiple serving cells, there are multiple HARQ entities per UE within the MAC entity (at the eNB or at the UE), which is the case of FIGS. 13-14.

When CoMP is configured, a UE may exchange data with multiple serving cells in both uplink and downlink, which is similar to the CA case. Consequently, the HARQ entity configuration of CA is considered as one option for a MAC entity supporting CoMP naturally. A first option (Option 1), which reuses current LTE HARQ entity configuration principle, is one independent HARQ entity per serving cell per UE within the MAC entity.

However, there are some significant differences between CA and CoMP cases. First, under certain CoMP schemes, the data exchange between UE and different serving cells occurs at different times, and thus UE exchanges data with only one serving cell in one subframe in either downlink or uplink direction. Second, under certain CoMP schemes, the physical layer data exchanged between UE and multiple serving cells may correspond to the content of the same MAC TB. Consequently, only one MAC TB is passing between PHY layer and MAC layer in the absence of spatial multiplexing. Consequently, a simplified option may be considered for HARQ entity configuration of a MAC entity supporting CoMP. A second option (Option 2) is one HARQ entity for a subset of serving cells of a UE.

For DL CoMP, JP-coherent JT, the data exchanged between UE and multiple serving cells correspond to the content of the same MAC TB. Thus Option 2 is preferable because of its simplicity. For DL CoMP, JP-non-coherent JT, there are two possibilities for the content of the data transmitted from different points/cells. First, if the data received by the UE from multiple serving cells correspond to the content of the same MAC TB, Option 2 is preferable because of its simplicity. Second, if the data received by the UE from multiple serving cells correspond to the content of different MAC TBs, Option 1 is preferable.

For DL CoMP, JP-DPS, the transmitting point may change from one subframe to another subframe. Therefore, it is possible that the initial HARQ transmission and following retransmissions of a MAC TB are done through different points. Therefore, the preferable HARQ entity configuration is Option 2, i.e., one HARQ entity handling multiple serving cells, because it simplifies the handling of HARQ transmission and retransmissions from different cells.

For DL CoMP, CS/CB, UE receives data from only one serving cell. Therefore, there is no difference between adopting Option 1 and adopting Option 2.

For DL CoMP, hybrid category of JP and CS/CB is a combination of the above possibilities.

For UL CoMP, JR, there are two possibilities for the content of the data transmitted to different points/cells. First, if the data transmitted by the UE to multiple serving cells correspond to the content of the same MAC TB, Option 2 is preferable because of its simplicity. Second, if the data transmitted by the UE to multiple serving cells correspond to the content of different MAC TBs, i.e., different cells receive different MAC TBs from the UE, Option 1 is preferable. For UL CoMP, CS/CB, UE sends data to only one serving cell. Therefore, there is no difference between adopting Option 1 and adopting Option 2.

Another CoMP deployment scenario that may be of interest is CoMP+CA. That is, the network exchanges data with UE over multiple carriers in carrier aggregation, and there may be several transmission/reception points communicating with UE using CoMP technique on each carrier. In particular, an additional carrier can be non-backwards compatible, on which UE may not find a conventional cell. In that case, those transmission points on the non-backwards compatible carrier would be part of a cell on the legacy carrier. However, different HARQ entities may still be preferred on those carriers, as different MAC TBs would be transmitted, just as with the current CA scenarios. When CoMP and CA are deployed jointly, the preferable HARQ entity configuration is an extension/generalization of Option 2: there is one HARQ entity per carrier per UE, and each HARQ entity handles HARQ processes of a subset of serving cells/points of the UE wherein all serving cells/points of the subset are on the same carrier.

In addition, in the following discussion the term "cells" can be generalized to "cells/points/carriers/ports/resources", unless specified otherwise. The generalization is based on new trends in long term evolution (LTE) networks, such as the ongoing discussion of "additional carrier types" described above. The additional carrier may be called a cell, a point, a carrier, or a port. There is also proposals in LTE-A, suggesting defining CoMP measurement set in terms of CSI-RS resources, instead of in terms of cell or point. So the generalization is used to cover potential applicable cases.

Option 1 (one HARQ entity per serving cell/point/carrier/port/resource per UE) conforms to existing HARQ configuration principles. However, frequent signaling generally is needed when multiple HARQ entities are closely coupled, and the timing requirement of the signaling may be stringent, e.g., whenever the transmission point is changed for a MAC TB under DPS;

Option 2 (one HARQ entity for a subset of serving cells points/carriers/ports/resources of a UE) has less signaling when multiple HARQ entities are closely coupled, and the timing requirement of the signaling may not be as stringent, e.g., only at the beginning of cell/point/carrier/port/resource addition. However, new radio resource control (RRC) messages may be needed for Option 2.

Based on the above analysis, Option 2 is a preferable HARQ entity configuration for most CoMP (sub-)categories. In current LTE standards, however, when an additional serving cell is added to a UE, a new independent HARQ entity is added to the corresponding MAC entity associated with the UE [2][3][4]. Therefore, a MAC entity has multiple independent HARQ entities per UE if the UE exchanges data with multiple serving cells, with each HARQ entity corresponding to one serving cell per UE. That is, only Option 1 is supported. In order to allow Option 2 as one option of HARQ entity configurations for a MAC entity, e.g., supporting CoMP, related LTE standards may need to be modified to enable the configuration of one HARQ entity handling multiple serving cells/points/carriers/ports/resources per UE. Several embodiments of this disclosure may be considered for configuring one HARQ entity for a subset of serving cells/points/carriers/ports/resources of a UE within a MAC entity.

In a first embodiment (Embodiment 1), there is one HARQ entity per UE for all serving units. As an example, this option may be considered as the default option for CoMP HARQ entity configuration when multiple serving units are configured.

In a second embodiment (Embodiment 2), it is configurable to have one HARQ entity for a subset of serving units of a UE. That is, having one HARQ entity for a subset of serving units of a UE is one of the available options for HARQ entity configuration when multiple serving units are configured. For example, when a new serving unit is added to a CoMP UE, the network may (1) request the UE (e.g., through RRC signaling, or by default) to add to the UE a new HARQ entity handling the HARQ operations of the newly added unit, or (2) request the UE (e.g., through RRC signaling, or by default) to associate HARQ operations of the newly added unit to an existing HARQ entity.

Potential modifications may be made to existing standards to achieve the incorporation of the following concepts. First, when a new serving unit is added to a UE, the network instructs the UE whether a new HARQ entity needs to be setup/initialized for that unit. Second, if the new unit is to be linked to an existing HARQ entity of the UE, the network instructs the UE which HARQ entity to use through a certain index, such as HARQ entity ID and/or cell ID. Note that it is possible that the mapping between cell ID and HARQ entity ID is not one-to-one and/or implicit.

Aspects of this disclosure may be implemented in various ways, such as by one of the following approaches. In a first approach (Approach 1), RRC messages/procedures/methods of CA SCell management are reused for CoMP serving unit management. New optional fields are added to related RRC messages, together with interpretation of the new fields. Because the existing RRC message/procedure/method for SCell addition/modification leads to MAC reconfiguration, changes may also be needed for MAC specifications to differentiate between UE behavior upon CA SCell addition/modification and CoMP serving unit addition/modification.

In a second approach (Approach 2), new RRC messages/procedures/methods for transmission/reception unit management are defined. That is, new RRC messages/procedures/methods are defined, together with interpretation of the messages. A unified signaling approach to support both CoMP and CA (additional carrier) schemes may be implemented. Both of Approaches 1 and 2 can support Embodiment 1 and Embodiment 2 described previously.

Several examples of implementing Embodiment 2 by Approach 2 are given below. Note that text passages below may exemplify additions or modification to one or more existing standards.

EXAMPLE 1

Define new RRC messages/procedures/methods for CoMP unit, and configure HARQ entity according to a new variable harqIndex introduced. The interpretation of the new RRC message/procedure/method is: (i) If the value of harqIndex is a value that has been used by an existing HARQ entity, the message links the newly added CoMP unit to an existing HARQ entity as specified;(ii) If the value of harqIndex is a value that has not been used by any existing HARQ entity, the message creates a new HARQ entity for the newly added CoMP unit.

| Within MAC-MainConfig information element | | | |
|---|---|---|---|
| MAC-MainConfig ::= | SEQUENCE { | | |
| ul-SCH-Config | SEQUENCE { | | |
| maxHARQ-Tx | ENUMERATED { | | |
| | n1, n2, n3, n4, n5, n6, n7, n8, | | |
| | n10, n12, n16, n20, n24, n28, | | |
| | spare2, spare1} | OPTIONAL, | -- Need ON |
| periodicBSR-Timer | ENUMERATED { | | |
| | sf5, sf10, sf16, sf20, sf32, sf40, sf64, sf80, | | |
| | sf128, sf160, sf320, sf640, sf1280, sf2560, | | |
| | infinity, spare1} | OPTIONAL, | -- Need ON |
| retxBSR-Timer | ENUMERATED { | | |
| | sf320, sf640, sf1280, sf2560, sf5120, | | |
| | sf10240, spare2, spare1}, | | |
| ttiBundling | BOOLEAN | | |

| Within MAC-MainConfig information element |
|---|

```
    }                                                       OPTIONAL,    -- Need ON
    drx-Config                  DRX-Config                  OPTIONAL,    -- Need ON
    timeAlignmentTimerDedicated TimeAlignmentTimer,
    phr-Config                  CHOICE {
        release                     NULL,
        setup                       SEQUENCE {
            periodicPHR-Timer           ENUMERATED {sf10, sf20, sf50, sf100, sf200,
                                            sf500, sf1000, infinity},
            prohibitPHR-Timer           ENUMERATED {sf0, sf10, sf20, sf50, sf100,
                                            sf200, sf500, sf1000},
            dl-PathlossChange           ENUMERATED {dB1, dB3, dB6, infinity}
        }
    }                                                       OPTIONAL,    -- Need ON
    ...,
    [[ sr-ProhibitTimer-r9      INTEGER (0..7)              OPTIONAL     -- Need ON
    ]],
    [[ mac-MainConfig-v1020     SEQUENCE {
        sCellDeactivationTimer-r10  ENUMERATED {
                                        rf2, rf4, rf8, rf16, rf32, rf64, rf128,
                                        spare}              OPTIONAL,    -- Need OP
        extendedBSR-Sizes-r10       ENUMERATED {setup}      OPTIONAL,    -- Need OR
        extendedPHR-r10             ENUMERATED {setup}      OPTIONAL     -- Need OR
    }                                                       OPTIONAL,    -- Need ON
    ]]
    harqIndex                   HARQIndex
}
```

| Within RadioResourceConfigDedicated information element |
|---|

```
RadioResourceConfigDedicatedCoMPSCell ::=  SEQUENCE {
    physicalConfigDedicatedSCell-r10    PhysicalConfigDedicatedSCell-r10    OPTIONAL,
    mac-MainConfig                      CHOICE {
        explicitValue                       MAC-MainConfig,
        defaultValue                        NULL
    }
    ...
}
```

| Within RRCConnectionReconfiguration message |
|---|

```
CoMPSCellToAddMod ::=               SEQUENCE {
    sCellIndex-r10                      SCellIndex-r10,
    cellIdentification-r10              SEQUENCE {
        physCellId-r10                      PhysCellId,
        dl-CarrierFreq-r10                  ARFCN-ValueEUTRA
    }                                                                           OPTIONAL,
    radioResourceConfigCommonSCell-r10  RadioResourceConfigCommonSCell-r10      OPTIONAL,
    radioResourceConfigDedicatedCoMPSCell RadioResourceConfigDedicatedCoMPSCell OPTIONAL,
    ...
```

Note 1:
The value(s) of variable harqIndex may be a single HARQ entity index value which corresponds to both DL and UL HARQ operations. It may also be a structure which contains a pair of HARQ entity indexes that correspond to Dl and UL HARQ operations respectively.
Note 2:
The naming/format in the above new/updated signaling assumes a CoMP serving 'cell' is newly added. The proposed signaling changes can be easily generalized to the case of serving point/carrier/port/resource management of multiple points operation.
Note 3:
In the above example, the new variable harqIndex is introduced/defined in MAC-MainConfig, which is the information element that provides MAC parameters. It is also feasible to introduce or define the new variable harqIndex in other places, e.g., in RadioResource-ConfigDedicated information element (such as in RadioResourceConfigDedicatedCoMPSCell), or in RRCConnectionReconfiguration message (such as in CoMPSCellToAddMod). The advantage of defining harqIndex in other places is that the (re)configuration may focus on HARQ entity setup/associating, and bypass other unnecessary (re)configuration. For example, if harqIndex is defined in RadioRe-sourceConfigDedicated through RadioResourceConfigDedicatedCoMPSCell as followed, UE does not need to go through the entire MAC-MainConfig as in the example above.

| Within RadioResourceConfigDedicated information element |
|---|

```
RadioResourceConfigDedicatedCoMPSCell ::=  SEQUENCE {
    physicalConfigDedicatedSCell-r10    PhysicalConfigDedicatedSCell-r10    OPTIONAL,
    harqIndex                           HARQIndex,
    ...
}
```

EXAMPLE 2

Define new RRC messages/procedures/methods for CoMP unit management, and configure HARQ entity according to a new variable newHARQ introduced. The interpretation of the new RRC message/procedure/method is: (i) If the value of newHARQ is newEntity (i.e., NULL), the message creates a new HARQ entity for the newly added CoMP unit, and the index of the new HARQ entity is {Max value of existing HARQ entity index }+1; (ii) If the value of newHARQ is reuseEntity, the message links the newly added CoMP unit to an existing HARQ entity as specified.

to Example 1. Notes 1-3 under Example 1 may apply here similarly.

EXAMPLE 3

Define new RRC messages/procedures/methods for CoMP unit management, and configure HARQ entity according to a new variable harqIndex introduced which is optionally present. The interpretation of the new RRC message/procedure/method is: (i) If the variable harqIndex is present, the message links the newly added CoMP unit to an existing HARQ entity as specified; (ii) If the variable harqIndex is

```
                        Within MAC-MainConfig information element

MAC-MainConfig ::=          SEQUENCE {
    ul-SCH-Config               SEQUENCE {
        maxHARQ-Tx                  ENUMERATED {
                                        n1, n2, n3, n4, n5, n6, n7, n8,
                                        n10, n12, n16, n20, n24, n28,
                                        spare2, spare1}             OPTIONAL,   -- Need ON
        periodicBSR-Timer           ENUMERATED {
                                        sf5, sf10, sf16, sf20, sf32, sf40, sf64, sf80,
                                        sf128, sf160, sf320, sf640, sf1280, sf2560,
                                        infinity, spare1}           OPTIONAL,   -- Need ON
        retxBSR-Timer               ENUMERATED {
                                        sf320, sf640, sf1280, sf2560, sf5120,
                                        sf10240, spare2, spare1},
        ttiBundling                 BOOLEAN
    }                                                               OPTIONAL,   -- Need ON
    drx-Config                  DRX-Config                          OPTIONAL,   -- Need ON
    timeAlignmentTimerDedicated TimeAlignmentTimer,
    phr-Config                  CHOICE {
        release                     NULL,
        setup                       SEQUENCE {
            periodicPHR-Timer           ENUMERATED {sf10, sf20, sf50, sf100, sf200,
                                            sf500, sf1000, infinity},
            prohibitPHR-Timer           ENUMERATED {sf0, sf10, sf20, sf50, sf100,
                                            sf200, sf500, sf1000},
            dl-PathlossChange           ENUMERATED {dB1, dB3, dB6, infinity}
        }
    }                                                               OPTIONAL,   -- Need ON
    ...,
    [[ sr-ProhibitTimer-r9      INTEGER (0..7)                      OPTIONAL    -- Need ON
    ]],
    [[ mac-MainConfig-v1020     SEQUENCE {
        sCellDeactivationTimer-r10  ENUMERATED {
                                        rf2, rf4, rf8, rf16, rf32, rf64, rf128,
                                        spare}                      OPTIONAL,   -- Need OP
        extendedBSR-Sizes-r10       ENUMERATED {setup}      OPTIONAL,   -- Need OR
        extendedPHR-r10             ENUMERATED {setup}      OPTIONAL    -- Need OR
    }                                                               OPTIONAL,   -- Need ON
    ]]
    newHARQ                     CHOICE {
        newEntity                   NULL,
        reuseEntity                 HARQIndex
    }
}
```

The updates to RadioResourceConfigDedicated information element (defining new RadioResourceConfigDedicated-CoMPSCell) and to RRCConnectionReconfiguration message (defining new CoMPSCellToAddMod) are similar absent, the message creates a new HARQ entity for the newly added CoMP unit. The UE may also assign an index to the new HARQ entity as {Max value of existing HARQ entity index}+1.

```
                        Within MAC-MainConfig information element

MAC-MainConfig ::=          SEQUENCE {
    ul-SCH-Config               SEQUENCE {
        maxHARQ-Tx                  ENUMERATED {
                                        n1, n2, n3, n4, n5, n6, n7, n8,
                                        n10, n12, n16, n20, n24, n28,
                                        spare2, spare1}             OPTIONAL,   -- Need ON
        periodicBSR-Timer           ENUMERATED {
                                        sf5, sf10, sf16, sf20, sf32, sf40, sf64, sf80,
                                        sf128, sf160, sf320, sf640, sf1280, sf2560,
                                        infinity, spare1}           OPTIONAL,   -- Need ON
```

| Within MAC-MainConfig information element | | | |
|---|---|---|---|
| retxBSR-Timer | ENUMERATED { sf320, sf640, sf1280, sf2560, sf5120, sf10240, spare2, spare1}, | | |
| ttiBundling | BOOLEAN | | |
| } | | OPTIONAL, | -- Need ON |
| drx-Config | DRX-Config | OPTIONAL, | -- Need ON |
| timeAlignmentTimerDedicated | TimeAlignmentTimer, | | |
| phr-Config | CHOICE { | | |
|   release |   NULL, | | |
|   setup |   SEQUENCE { | | |
|     periodicPHR-Timer |     ENUMERATED {sf10, sf20, sf50, sf100, sf200, sf500, sf1000, infinity}, | | |
|     prohibitPHR-Timer |     ENUMERATED {sf0, sf10, sf20, sf50, sf100, sf200, sf500, sf1000}, | | |
|     dl-PathlossChange |     ENUMERATED {dB1, dB3, dB6, infinity} | | |
|   } | | | |
| } | | OPTIONAL, | -- Need ON |
| ..., | | | |
| [[ sr-ProhibitTimer-r9 | INTEGER (0..7) | OPTIONAL | -- Need ON |
| ]], | | | |
| [[ mac-MainConfig-v1020 | SEQUENCE { | | |
|   sCellDeactivationTimer-r10 |   ENUMERATED { rf2, rf4, rf8, rf16, rf32, rf64, rf128, spare} | OPTIONAL, | -- Need OP |
|   extendedBSR-Sizes-r10 |   ENUMERATED {setup} | OPTIONAL, | -- Need OR |
|   extendedPHR-r10 |   ENUMERATED {setup} | OPTIONAL | -- Need OR |
| } | | OPTIONAL, | -- Need ON |
| ]] | | | |
| harqIndex | HARQIndex | OPTIONAL | |
| } | | | |

The updates to RadioResourceConfigDedicated information element (defining new RadioResourceConfigDedicated-CoMPSCell) and to RRCConnectionReconfiguration message (defining new CoMPSCellToAddMod) are similar to Example 1. Notes 1-3 under Example 1 may apply here similarly.

Similar examples 1A-3A can be provided for implementing Embodiment 2 by Approach 1. For instance, Example 2A is provided below, and it is comparable to Example 2.

EXAMPLE 2A

Reuse CA SCell management messages/procedures/methods for CoMP unit management, and configure HARQ entity according to a new variable newHARQ introduced. The interpretation of the RRC message/procedure/method is: (i) If the value of newHARQ is newEntity (i.e., NULL), the message creates a new HARQ entity for the newly added CoMP unit, and the index of the new HARQ entity is {Max value of existing HARQ entity index}+1; (ii) If the value of newHARQ is reuseEntity, the message links the newly added CoMP unit to an existing HARQ entity as specified.

| Within MAC-MainConfig information element | | | |
|---|---|---|---|
| MAC-MainConfig ::= | SEQUENCE { | | |
|   ul-SCH-Config |   SEQUENCE { | | |
|     maxHARQ-Tx |     ENUMERATED { n1, n2, n3, n4, n5, n6, n7, n8, n10, n12, n16, n20, n24, n28, spare2, spare1} | OPTIONAL, | -- Need ON |
|     periodicBSR-Timer |     ENUMERATED { sf5, sf10, sf16, sf20, sf32, sf40, sf64, sf80, sf128, sf160, sf320, sf640, sf1280, sf2560, infinity, spare1} | OPTIONAL, | -- Need ON |
|     retxBSR-Timer |     ENUMERATED { sf320, sf640, sf1280, sf2560, sf5120, sf10240, spare2, spare1}, | | |
|     ttiBundling |     BOOLEAN | | |
|   } | | OPTIONAL, | -- Need ON |
|   drx-Config |   DRX-Config | OPTIONAL, | -- Need ON |
|   timeAlignmentTimerDedicated |   TimeAlignmentTimer, | | |
|   phr-Config |   CHOICE { | | |
|     release |     NULL, | | |
|     setup |     SEQUENCE { | | |
|       periodicPHR-Timer |       ENUMERATED {sf10, sf20, sf50, sf100, sf200, sf500, sf1000, infinity}, | | |
|       prohibitPHR-Timer |       ENUMERATED {sf0, sf10, sf20, sf50, sf100, sf200, sf500, sf1000}, | | |
|       dl-PathlossChange |       ENUMERATED {dB1, dB3, dB6, infinity} | | |
|     } | | | |

-continued

| Within MAC-MainConfig information element | | | |
|---|---|---|---|
| } | | OPTIONAL, | -- Need ON |
| ..., | | | |
| [[ sr-ProhibitTimer-r9 | INTEGER (0..7) | OPTIONAL | -- Need ON |
| ]], | | | |
| [[ mac-MainConfig-v1020 | SEQUENCE { | | |
|     sCellDeactivationTimer-r10 | ENUMERATED { | | |
| | rf2, rf4, rf8, rf16, rf32, rf64, rf128, | | |
| | spare} | OPTIONAL, | -- Need OP |
|     extendedBSR-Sizes-r10 | ENUMERATED {setup} | OPTIONAL, | -- Need OR |
|     extendedPHR-r10 | ENUMERATED {setup} | OPTIONAL | -- Need OR |
| } | | OPTIONAL, | -- Need ON |
| ]] | | | |
| newHARQ | CHOICE { | | |
|     newEntity | NULL, | | |
|     reuseEntity | HARQIndex | | |
| } OPTIONAL, | | | -- Cond CoMPSCelladd |
| } | | | |

| Within RadioResourceConfigDedicated information element | | |
|---|---|---|
| RadioResourceConfigDedicatedSCell-r10 ::= | SEQUENCE { | |
|   -- UE specific configuration extensions | applicable for an SCell | |
|   physicalConfigDedicatedSCell-r10 | PhysicalConfigDedicatedSCell-r10 | OPTIONAL, -- Need ON |
|   mac-MainConfig | CHOICE { | |
|     explicitValue | MAC-MainConfig, | |
|     defaultValue | NULL | |
|   } OPTIONAL, | | -- Cond CoMPSCelladd |
| ... | | |
| } | | |

Examples 1A and 3A can be derived similarly based on Examples 1 and 3.

As for implementing Embodiment 1 by Approach 2, one example is defining a new CoMPSCellToAddMod within RRC message RRCConnectionReconfiguration (e.g., as shown in Example 1), and specify the RRC procedure as follows:

Section: CoMP serving cell addition: The UE shall: for each new CoMP SCell: 1> add the CoMP SCell, according to CoMPSCellToAddMod; 2> if the CoMP SCell is the first CoMP SCell: 3> establish a new HARQ entity for this cell; 2> else: 3> use the existing HARQ entity for this cell;

Regarding implementing Embodiment 1 by Method 1, one example is updating the RRC procedure of SCell addition/modification (36.331 Section 5.3.10.3b) and the MAC reconfiguration procedure (36.321 Section 5.8) to:

Third Generation Partnership Project (3GPP) Standards publication 36.331 release 11 (2012) is incorporated by reference herein as if reproduced in its entirety. The following may be relevant to 3GPP 36.331 §5.4.10.3b: SCell addition/modification. The UE shall: 1> for each sCellIndex value included in the sCellToAddModList that is not part of the current UE configuration (SCell addition): 2> add the SCell, corresponding to the cellIdentification, in accordance with the received radioResourceConfigCommonSCell and radioResourceConfigDedicatedSCell; 2> indicate to MAC layer whether the new SCell is a CoMP SCell; 2> configure lower layers to consider the SCell to be in deactivated state; 1> for each sCellIndex value included in the sCellToAddModList that is part of the current UE configuration (SCell modification): 2> modify the SCell configuration in accordance with the received radioResourceConfigDedicatedSCell. 5.8 MAC reconfiguration. When a reconfiguration of the MAC entity is requested by upper layers, the UE shall: upon addition of an SCell which is not a CoMP SCell, initialize the corresponding HARQ entity; upon addition of the first CoMP SCell, initialize the corresponding HARQ entity; upon removal of an SCell which is not a CoMP SCell, remove the corresponding HARQ entity; upon removal of the last CoMP SCell, remove the corresponding HARQ entity; for timers apply the new value when the timer is (re)started; when counters are initialized apply the new maximum parameter value; for other parameters, apply immediately the configurations received from upper layers. Note that combinations of the above examples, or elements of the above examples, also may be used to implement various embodiments.

Note that combinations of the above examples, or elements of the above examples, also may be used to implement various embodiments.

Figure 15:
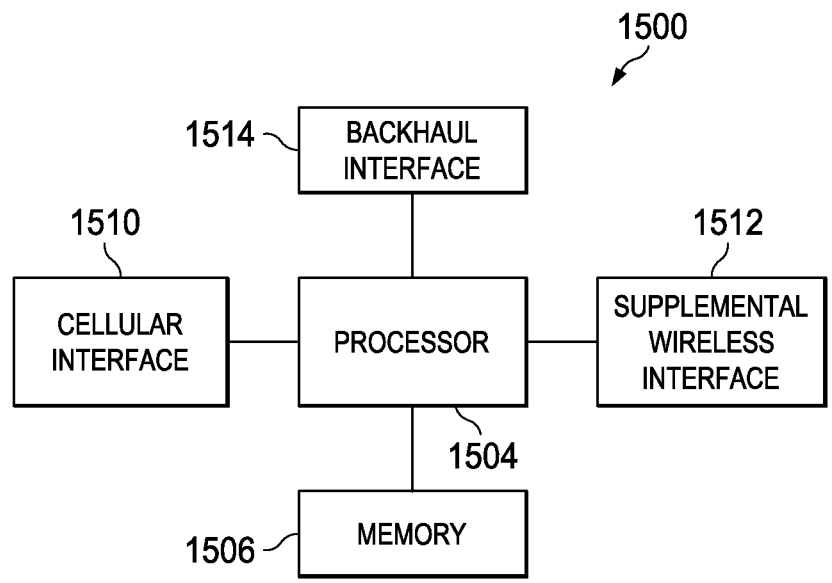
FIG. 15 illustrates a block diagram of an embodiment communications device.

FIG. 15 illustrates a block diagram of an embodiment of a communications device 1500, which may be equivalent to one or more devices (e.g., UEs, eNBs, controllers, etc.) discussed above. The communications device 1500 may include a processor 1504, a memory 1506, a cellular interface 1510, a supplemental wireless interface 1512, and a backhaul interface 1514, which may (or may not) be arranged as shown in FIG. 15. The processor 1504 may be any component capable of performing computations and/or other processing related tasks, and the memory 1506 may be any component capable of storing programming and/or instructions for the processor 1504. The cellular interface 1510 may be any component or collection of components that allows the communications device 1500 to communicate using a cellular signal, and may be used to receive and/or transmit information over a cellular connection of a cellular network. The supplemental wireless interface 1512 may be any component or collection of components that allows the communications device 1500 to communicate via a non-cellular wireless protocol, such as a Wi-Fi or Bluetooth protocol, or a control protocol. The device 1500 may use the cellular interface 1510 and/or the supplemental wireless interface 1512 to communicate with any wirelessly enabled component, e.g., a controller, a base station, relay, mobile device, etc. The backhaul interface 1514 may be any component or collection of components that allows the communications device 1500 to communicate via a supplemental protocol, including wire-line protocols. In embodiments, the backhaul interface 1514 may allow the device 1500 to communicate with another component, such as a backhaul network component.

Figure 16:
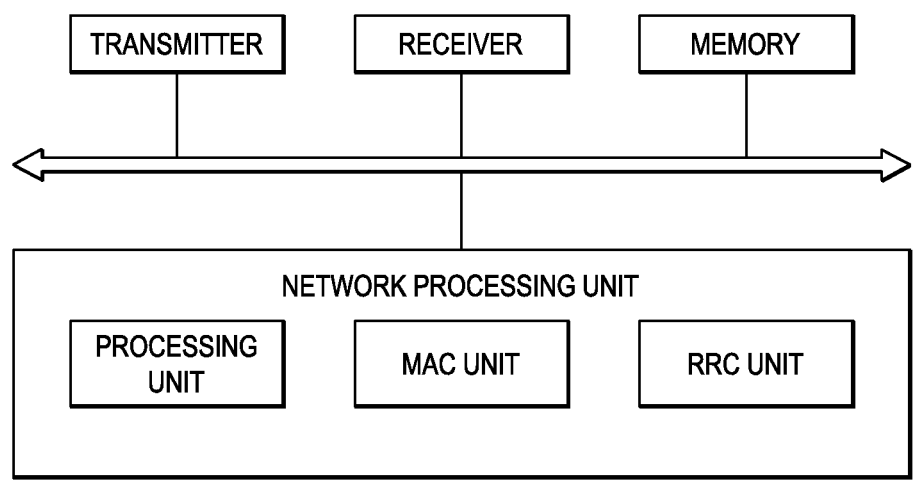
FIG. 16 illustrates a block diagram of an embodiment computing platform.

FIG. 16 is a block diagram of a processing system that may be used for implementing the systems and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may be an implementation of a network entity (e.g., eNB, UE, controller), or part of an existing network entity.

As shown in FIG. 16, a transmitter is configured to transmit information and a receiver is configured to receive information. The transmitter and receiver may have a wireless interface, a wireline interface, or a combination thereof. In practice, the transmitter and receiver might be implemented in a single unit of hardware.

A processing unit is configured to process data and/or control messages exchanged between network entities, e.g., between eNB and UE(s). For example, RRC messages on HARQ entity configuration may be processed by the processing unit and then directed to RRC unit and/or MAC unit accordingly. In addition, the processing unit may be capable of interacting with Radio Link Control (RLC) and/or Packet Data Convergence Protocol (PDCP) entities, or performing the functionalities of RLC and/or PDCP entities.

A Medium Access Control (MAC) unit is configured to perform the functionalities of a MAC entity. A Radio Resource Control (RRC) unit is configured to perform the functionalities of a RRC entity.

The elements of a network processing unit may be implemented as specific hardware logic blocks. In an alternative, the elements of the processing system may be implemented as software executing in a processor, microprocessor, digital signal processor, controller, application specific integrated circuit, or so on. In yet another alternative, the elements of the processing system may be implemented as a combination of software and/or hardware.

The memory may comprise any type of transitory or non-transitory system memory and/or mass storage device, such as static random access memory (SRAM), dynamic random access memory (DRAM), synchronous DRAM (SDRAM), read-only memory (ROM), a solid state drive, hard disk drive, a magnetic disk drive, an optical disk drive. The memory may be configured to store data, programs, and other information and to make the data, programs, and other information accessible to the network processing unit.

The following references are related to subject matter of the present application. Each of these references is incorporated herein by reference in its entirety: 3GPP TR 36.819 v11.0.0, Coordinated multi-point operation for LTE physical layer aspects (Release 11), September 2011; 3GPP TS 36.300 v11.0.0, 3GPP E-UTRA and E-UTRAN overall description stage 2 (Release 11), December 2011; 3GPP TS 36.321 v10.4.0, 3GPP E-UTRA MAC protocol specification (Release 10), December 2011; and 3GPP TS 36.331 v10.4.0, 3GPP E-UTRA RRC protocol specification (Release 10), December 2011.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
communicating a first radio resource control (RRC) message between a network entity and a user equipment (UE), wherein the first RRC message instructs the UE to associate a single hybrid automatic repeat request (HARQ) entity with multiple serving units serving the UE, wherein the single HARQ entity is configured to perform HARQ operations with each of the multiple serving units serving the UE, and wherein the multiple serving units correspond to different component carriers, cells, or communication points.

2. The method of claim 1, wherein the multiple serving units include two or more serving units that are distinguishable from one another at a medium access control (MAC) layer of the UE.

3. The method of claim 1, wherein the single HARQ entity is configured to perform HARQ operations with all serving units serving the UE.

4. The method of claim 1, wherein the first RRC message identifies the multiple serving units by specifying a property associated with each of the multiple serving units.

5. The method of claim 1, wherein the first RRC message identifies the single HARQ entity by specifying a property associated with the single HARQ entity.

6. The method of claim 1, wherein the first RRC message specifies a HARQ identifier associated with the single HARQ entity.

7. The method of claim 1, further comprising:
adding an additional serving unit to serve the user equipment (UE); and
associating a second HARQ entity with the additional serving unit by communicating a second radio resource control (RRC) message between a network entity and the UE, wherein the second RRC message explicitly or implicitly instructs the UE to associate the second HARQ entity with the additional serving unit.

8. The method of claim 7, wherein the second RRC message identifies the additional serving unit by specifying a property associated with the additional serving unit.

9. The method of claim 7, wherein the second RRC message identifies the second HARQ entity by specifying a property associated with the second HARQ entity.

10. The method of claim 7, wherein the second RRC message specifies a HARQ identifier associated with the second HARQ entity.

11. The method of claim 1, wherein each of the multiple serving units correspond to a different component carrier.

12. The method of claim 1, wherein each of the multiple serving units correspond to a different cell.

13. The method of claim 1, wherein each of the multiple serving units correspond to a different communication point.

14. The method of claim 1, further comprising:
removing an association between the single HARQ entity and a first serving unit in the multiple serving units, wherein a second serving unit remains associated with the single HARQ entity after removing the association between the single HARQ entity and the first serving unit.

15. An apparatus comprising:
a processor; and
a computer readable storage medium storing programming for execution by the processor, the programming including instructions to:
communicate a radio resource control (RRC) message between a network entity and a user equipment (UE), wherein the RRC message instructs the UE to associate a single hybrid automatic repeat request (HARQ) entity with multiple serving units serving the UE, wherein the single HARQ entity is configured to perform HARQ operations with each of the multiple serving units serving the UE, and wherein the multiple serving units correspond to different component carriers, cells, or communication points.

16. The apparatus of claim 15, wherein the apparatus comprises a network entity.

17. The apparatus of claim 15, wherein the apparatus comprises the UE.

18. The apparatus of claim 15, wherein each of the multiple serving units correspond to a different component carrier.

19. The apparatus of claim 15, wherein each of the multiple serving units correspond to a different cell.

20. The apparatus of claim 15, wherein each of the multiple serving units correspond to a different communication point.

21. A method comprising:
communicating a first radio resource control (RRC) message between a network entity and a user equipment (UE), wherein the first RRC message instructs the UE to reconfigure an existing hybrid automatic repeat request (HARQ) entity in the UE to associate the existing HARQ entity with at least a new serving unit adapted to serve the UE, wherein the existing HARQ entity was associated with at least an existing serving unit adapted to serve the UE prior to the existing HARQ entity being reconfigured, and wherein the new serving unit and the existing serving unit correspond to different component carriers, cells, or communication points.

22. The method of claim 21, wherein the first RRC message instructs the UE to associate the existing HARQ entity with the new serving unit without removing an association between the existing HARQ entity and the existing serving unit such that the existing HARQ entity is associated with both the new serving unit and the existing serving unit after being reconfigured.

23. The method of claim 21, wherein the first RRC message instructs the UE to remove an association between the existing HARQ entity and the existing serving unit such that the existing HARQ entity is associated with the new serving unit without being associated with the existing serving unit after being reconfigured.

24. The method of claim 21, wherein the first RRC message instructs the UE to reconfigure the existing HARQ entity by adding an association between the existing HARQ entity and the new serving unit, and wherein the first RRC message identifies the new serving unit by specifying a property associated with the new serving unit.

25. The method of claim 21, wherein the first RRC message identifies the existing HARQ entity by specifying a property associated with the existing HARQ entity.

26. The method of claim 21, wherein the first RRC message identifies the existing HARQ entity by specifying a HARQ identifier associated with the existing HARQ entity.

27. The method of claim 21 further comprising:
identifying a serving cell to be added; and
performing a default association when the first RRC message does not associate a HARQ identifier with the serving cell to be added, wherein performing the default association includes associating the existing HARQ entity with the serving cell to be added.

28. An apparatus comprising:
a processor; and
a computer readable storage medium storing programming for execution by the processor, the programming including instructions to:
communicate a radio resource control (RRC) message between a network entity and a user equipment (UE), wherein the RRC message instructs the UE to reconfigure an existing hybrid automatic repeat request (HARQ) entity in a user equipment (UE) to associate the existing HARQ entity with at least a new serving unit adapted to serve the UE, wherein the existing HARQ entity was associated with at least an existing serving unit adapted to serve the UE prior to the existing HARQ entity being reconfigured, and wherein the new serving unit and the existing serving unit correspond to different component carriers, cells, or communication points.

29. The apparatus of claim 28, wherein the apparatus comprises a network entity.

30. The apparatus of claim 28, wherein the RRC message identifies the new serving unit by specifying a property associated with the new serving unit.

31. The apparatus of claim 28, wherein the RRC message identifies the existing HARQ entity by specifying a property associated with the existing HARQ entity.

32. The apparatus of claim 28, wherein the RRC message identifies the existing HARQ entity by specifying a HARQ identifier associated with the existing HARQ entity.

* * * * *